United States Patent [19]
Cho

[11] Patent Number: 5,775,455
[45] Date of Patent: Jul. 7, 1998

[54] STEERING MECHANISM FOR ELECTRIC VEHICLES WITH AN OFF-CENTER MOUNTED DRIVE WHEEL

[76] Inventor: In Hee Cho, 250-1, Duckpoong-Dong, Hanam, Kyungki-Do, Rep. of Korea

[21] Appl. No.: 563,592

[22] Filed: Nov. 28, 1995

[30] Foreign Application Priority Data

Aug. 30, 1995 [KR] Rep. of Korea ............... 1995-23128

[51] Int. Cl.$^6$ ............................................. B60K 17/30
[52] U.S. Cl. ............................................. 180/264; 180/23
[58] Field of Search .................................. 180/264, 213, 180/214, 350, 357, 234, 235, 239, 237, 266, 267, 21, 22, 23, 321, 424; 280/97

[56] References Cited

U.S. PATENT DOCUMENTS

| | | | |
|---|---|---|---|
| 760,120 | 5/1904 | Hicks | 180/22 |
| 1,112,434 | 10/1914 | Burrell | 180/22 |
| 2,606,623 | 8/1952 | Vickers | 180/264 |
| 3,237,709 | 3/1966 | Sherwen | 180/321 |
| 3,876,026 | 4/1975 | Pronasko | 180/23 |
| 3,888,324 | 6/1975 | Kossow | 180/264 |
| 3,963,262 | 6/1976 | Estell | 180/321 |

FOREIGN PATENT DOCUMENTS 631960  11/1961  Canada  ............... 180/264

*Primary Examiner*—Brian L. Johnson
*Assistant Examiner*—Gary Savitt
*Attorney, Agent, or Firm*—Banner & Witcoff, Ltd.

[57] ABSTRACT

A steering device for an amusement car including a drive wheel mounted off-center on a wheel shaft to provide a rotation force for quick and automatic recovery of the steering device to steer the car away from an obstacle that is encountered during use. The drive wheel being mounted to the wheel shaft in an area bounded by a distance equal to the radius of the drive wheel and a distance equal to the diameter of the drive wheel, both measured from the center of the wheel shaft.

5 Claims, 5 Drawing Sheets

STEERING MECHANISM FOR ELECTRIC VEHICLES WITH AN OFF-CENTER MOUNTED DRIVE WHEEL

BACKGROUND OF THE INVENTION

1. Field of the Invention

The present invention relates to a steering device for amusement cars, and more particularly to a steering device for an amusement car including a drive wheel placed at a position slightly spaced toward one side apart from the central portion of a wheel shaft connected to a steering handle so that when the amusement car crashes against an obstacle or another amusement car, it can be automatically steered to escape from the obstacle by a rotation force of the drive wheel without any manipulation of the handle by the driver.

2. Description of the Prior Art

Generally, amusing cars are classified into manual types, wherein the car body is moved and steered by the pedals and steering handle without using any separate power source, and power control types, wherein a rotating shaft is driven by the drive power from a motor mounted to the car body and is controlled by a switch and a steering handle.

Typically, such amusement cars are provided with a planar joint which is integral with the connection between the rotating shaft and the wheel shaft. Taking the user's age into consideration, it is desirable to have a smoother manipulation of the steering handle. In order to achieve this, another joint construction has also been proposed which includes a universal joint connected to a connection for the handle shaft, as well as a bearing and an independently driven joint both mounted to a connection between the handle shaft and the wheel shaft. In this case, amusement cars can be driven with a minimum steering force and have the minimum turning radius.

When such conventional amusement cars are dashed against an obstacle, they require the user's rapid judgement and appropriate manipulation of the steering handle to escape the situation because the turning center of the drive wheel is positioned at the central portion of the wheel shaft.

However, growing children drivers, who lack circumstantial judgement find it difficult to appropriately cope with the above-mentioned situation. If the adults supervising the children are not paying attention to those drivers, a safety accident may occur. In some cases, the age group allowed to drive the, amusement car is limited even when the driver is supervised by an adult.

Power-controlled amusement cars requiring a supply of electric power are provided with a flexible wire extending between the car body and the wheel shaft to connect a power line from the battery to a power terminal of the motor. When the steering handle is excessively rotated in one direction, the flexible wire becomes tense while being wound around the handle shaft. In this case, the flexible wire may be cut, thereby shutting off the supply of electric power. For this reason, the maximum rotating range of the steering handle is limited to 360°. Furthermore, such conventional amusing cars involve a troublesome manipulation that after being rotated to a certain angle in one direction, the steering handle should be reversely rotated to its original position to prevent the wire from being twisted.

In conventional amusement cars, it, therefore, is impossible to determine the advance direction by rotating the steering handle through an angle of more than 360°.

SUMMARY OF THE INVENTION

Therefore, an object of the invention is to eliminate the above-mentioned problems involved in the prior art and to provide an amusement car having an unlimited manipulation range of its steering handle, thereby being capable of rapidly coping with any situation.

Another object of the invention is to provide a steering device for an amusement car capable of various advantages in turning similar to those obtained when an actual car is driven, in accordance with the rotational degree of the steering handle.

Another object of the invention is to provide an amusement car including an assistant steering handle for a supervising adult which is operatively connected with a driver's steering handle so that a child driver can drive the amusement car in a relaxed, comfortable state.

In accordance with the present invention, these objects are accomplished by providing a steering device for an amusement car comprising: a pair of idle wheels mounted to both ends of a front wheel shaft equipped in the amusing car by means of bearings such that they rotate freely; a drive wheel fixedly mounted to the wheel shaft at a position spaced to one side from the central portion of the wheel shaft; a sprocket fixedly mounted to the wheel shaft in one side of the drive wheel; a bracket mounted to the wheel shaft such that it does not interfere with a rotation of the wheel shaft, the bracket supporting a drive motor therein; a rotating shaft fixedly mounted at one end thereof to the bracket; a steering handle fixedly mounted to the other end of the rotating shaft and adapted to steer the front wheel shaft; another sprocket mounted to a shaft of the drive motor and connected to the sprocket mounted to the wheel shaft by a chain; a pair of annular contact plates respectively having different diameters, the annular contact plates being disposed on a top surface of the bracket and connected to electric terminals of the motor, respectively; and a pair of contact members respectively connected to electric terminals of a battery carried in a car body of the amusement car, the contact members being in contact with the annular contact plates, respectively.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
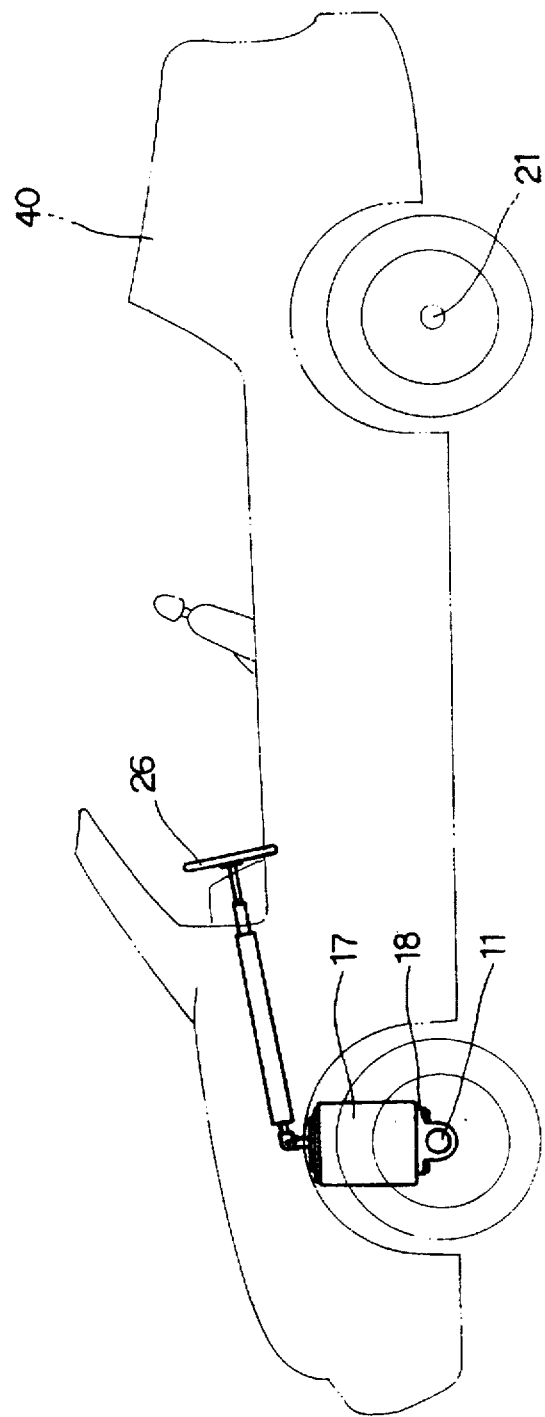
FIG. 1 is a schematic side view illustrating a amusement car equipped with a steering device in accordance with a first embodiment of the present invention.
Figure 2:
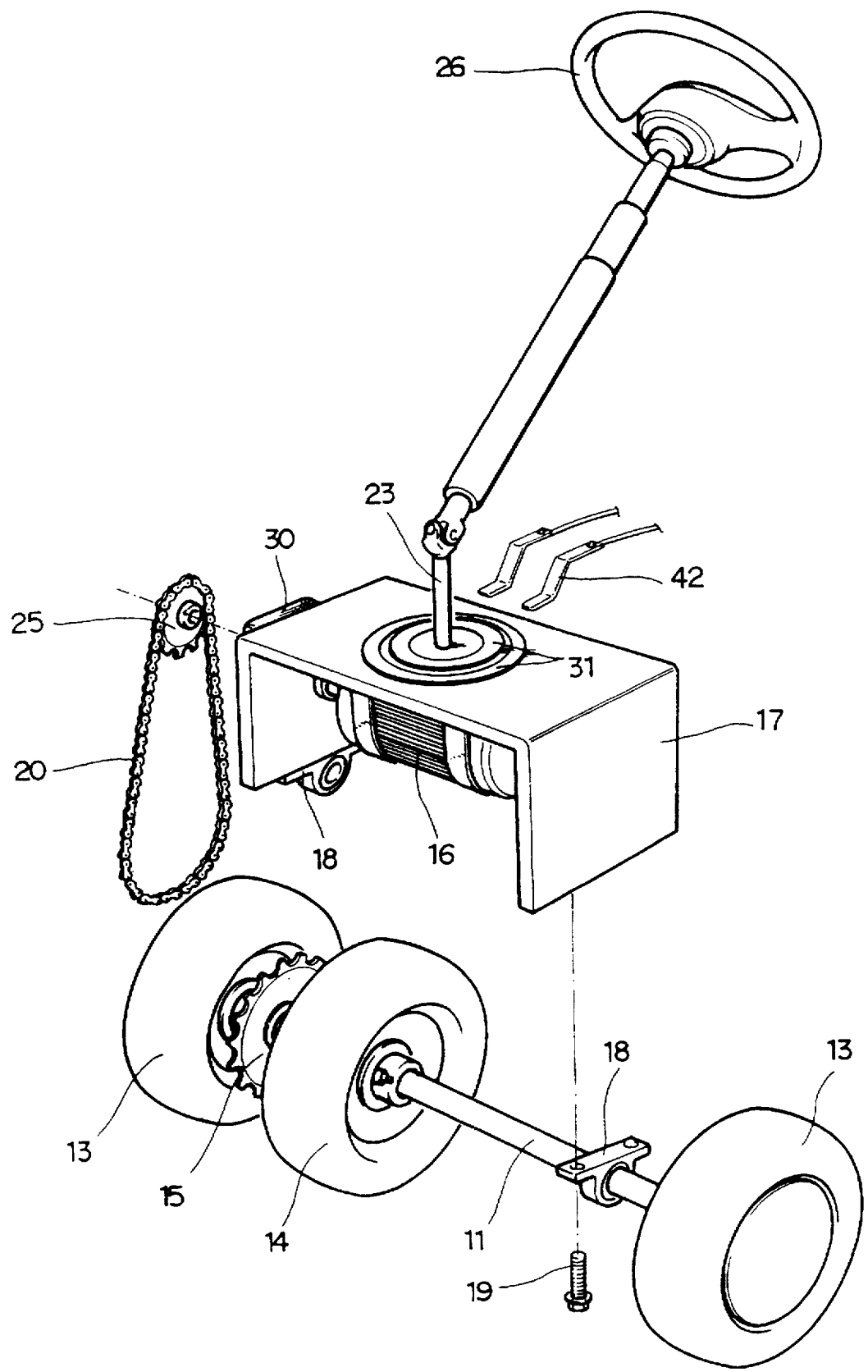
FIG. 2 is a partially exploded perspective view illustrating the steering device in accordance with the first embodiment of the present invention.
Figure 3:
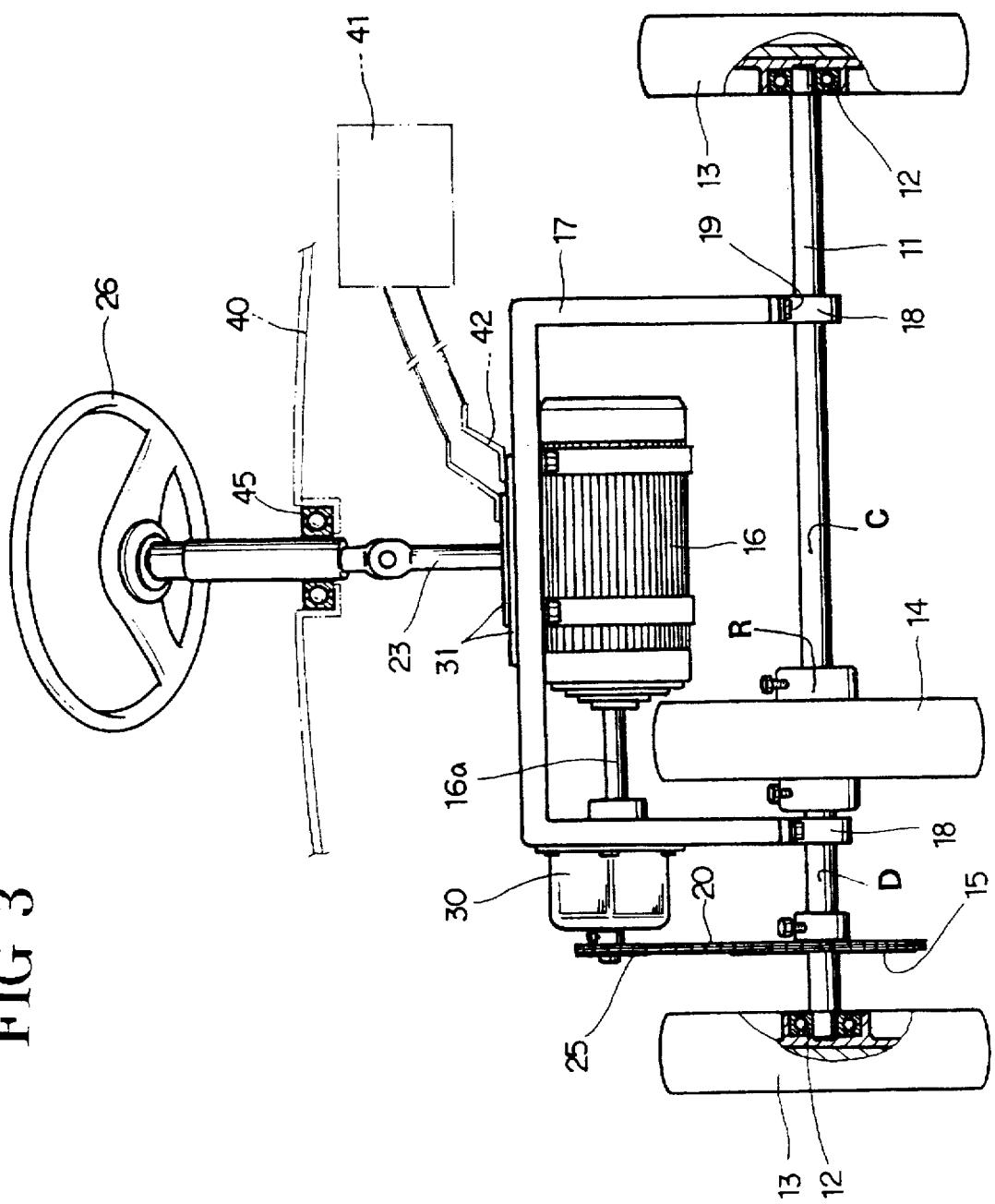
FIG. 3 is a front view illustrating the steering device in accordance with the first embodiment of the present invention.
Figure 4:
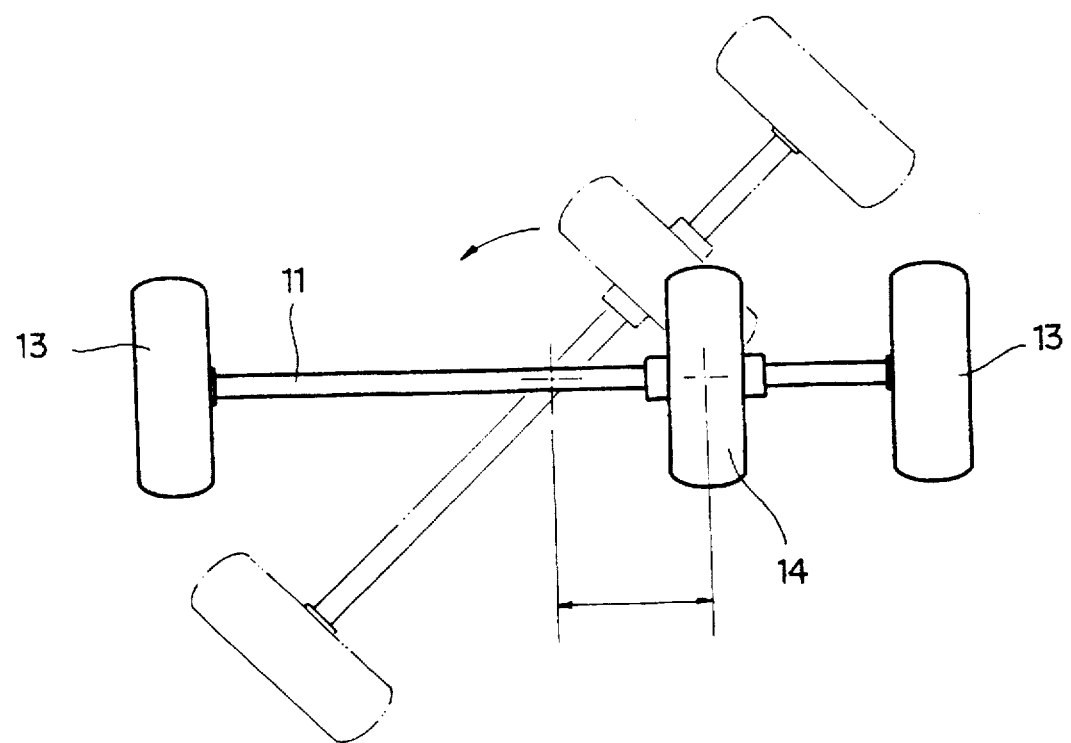
FIG. 4 is a schematic view explaining the steering operation carried out by a drive wheel in the steering device in accordance with the first embodiment of the present invention.

Referring to FIGS. 1 to 3, a steering device according to a first embodiment of the present invention is shown which is applied to an amusement car.

As shown in FIGS. 1 to 3, the steering device includes a wheel shaft 11, a pair of idle wheels 13 rotatably mounted to both ends of the wheel shaft 11 by means of bearings 12, and a drive wheel 14 fixedly mounted to the wheel shaft 11 and adapted to supply a drive power to the car body which is denoted by the reference numeral 40.

The drive wheel 14 mounted to the wheel shaft 11 separately from the idle wheels 13 is disposed at a position spaced toward one side apart from the central portion of wheel shaft 11. The central portion is the area of the shaft which includes a geometric center point C defined as the point mid-way between the ends of shaft 11 as seen in FIG. 3. It is preferred that the spaced length of the drive wheel 14 from the central portion of wheel shaft 11 is not more than the length corresponding to the diameter of the drive wheel 14. This point is labeled D on the shaft in FIG 3. It is further preferred that the drive wheel 14 be positioned between a position spaced apart from the central portion of wheel shaft 11 by the distance corresponding to the radius of the drive wheel 14, the point labeled R on the shaft in FIG. 3 and a position spaced apart from the central portion of wheel shaft 11 by the distance corresponding to the diameter of the drive wheel 14. Although easy steering manipulation can be obtained in a case wherein the drive wheel 14 is positioned at the central portion of wheel shaft 11, the car cannot be automatically steered when it crashes against an obstacle unless a separate control therefor is given. For this reason, the drive wheel 14 is disposed at a position spaced toward one side apart from the central portion of wheel shaft 11. Where the drive wheel 14 is disposed at a position spaced too far from the central portion of wheel shaft 11, a large torque is applied to the steering handle upon manipulating it. In this case, accordingly, a considerable force is required for children to manipulate the steering handle. Furthermore, a phenomenon that the car body is tilted toward one side is frequently generated even when the car runs normally.

At one side portion of the wheel shaft 11, a sprocket 15 is fixedly mounted to the wheel shaft 11. Above the wheel shaft 11, a bracket 17, to which a motor 16 is attached, is mounted to the wheel shaft by means of mounting members 18 and bolts 18 such that it does not interfere with the rotation of the wheel shaft 11.

The motor 16 installed in the bracket 17 has a shaft 16a which is provided at its end with a sprocket 25 coupled to the sprocket 15 by a chain 20.

As shown in FIG. 3, an upwardly extending rotating shaft 23 is fixedly mounted to the bracket 17. The rotating shaft 23 is coupled to a steering handle 26 and rotatably supported at an appropriate portion thereof to the car body 40 by means of a bearing 45. When the rotating shaft 23 is rotated by a rotation of the steering handle 26, the bracket 17 is turned along with the wheel shaft 11. Accordingly, desirable steering can be carried out.

A reduction unit 30 is coupled to the shaft 16a of the motor 16 to reduce the rotational speed of the motor 16 to a desired level. The reduction unit 30 may comprise a set of gears to provide a certain reduction ratio. The reduction unit 30 may also comprise a well-known reduction unit which is commercially available.

Where the former reduction unit is used which comprises a set of gears to provide a certain reduction ratio, there are advantages of inexpensive construction and of easy maintenance and repair. In this case, however, the overall construction is bulky, thereby causing the car body to have an increased total height. In the case of the latter reduction unit, the volume of its construction is minimized even though the cost more or less increases. By virtue of the compact construction, there is the advantage that the car body has a reduced total height. The reduction ratio can also be easily controlled.

On the top surface of the bracket 17, a pair of annular contact plates 31 respectively having different diameters are disposed. These contact plates 31 constitute electric terminals of the motor 16, respectively.

A pair of contact members 42 are in contact with the annular contact plates 31, respectively. The contact members 42 are respectively connected to different leads of the power line extending from the battery 41 carried in the car body 40. It is preferred that each contact member 42 has a plate spring construction to maintain the contact in a stable state.

With the above-mentioned construction, the steering device according to the present invention achieves a free steering involving no limitation on the rotation angle of the steering handle 26. In particular, the overall construction of the driving unit including the motor 16 and the bracket 17 mounted to the wheel shaft 11 can be turned through an angle of 360° or through repeated optional normal and reverse turning angles.

Figure 5:
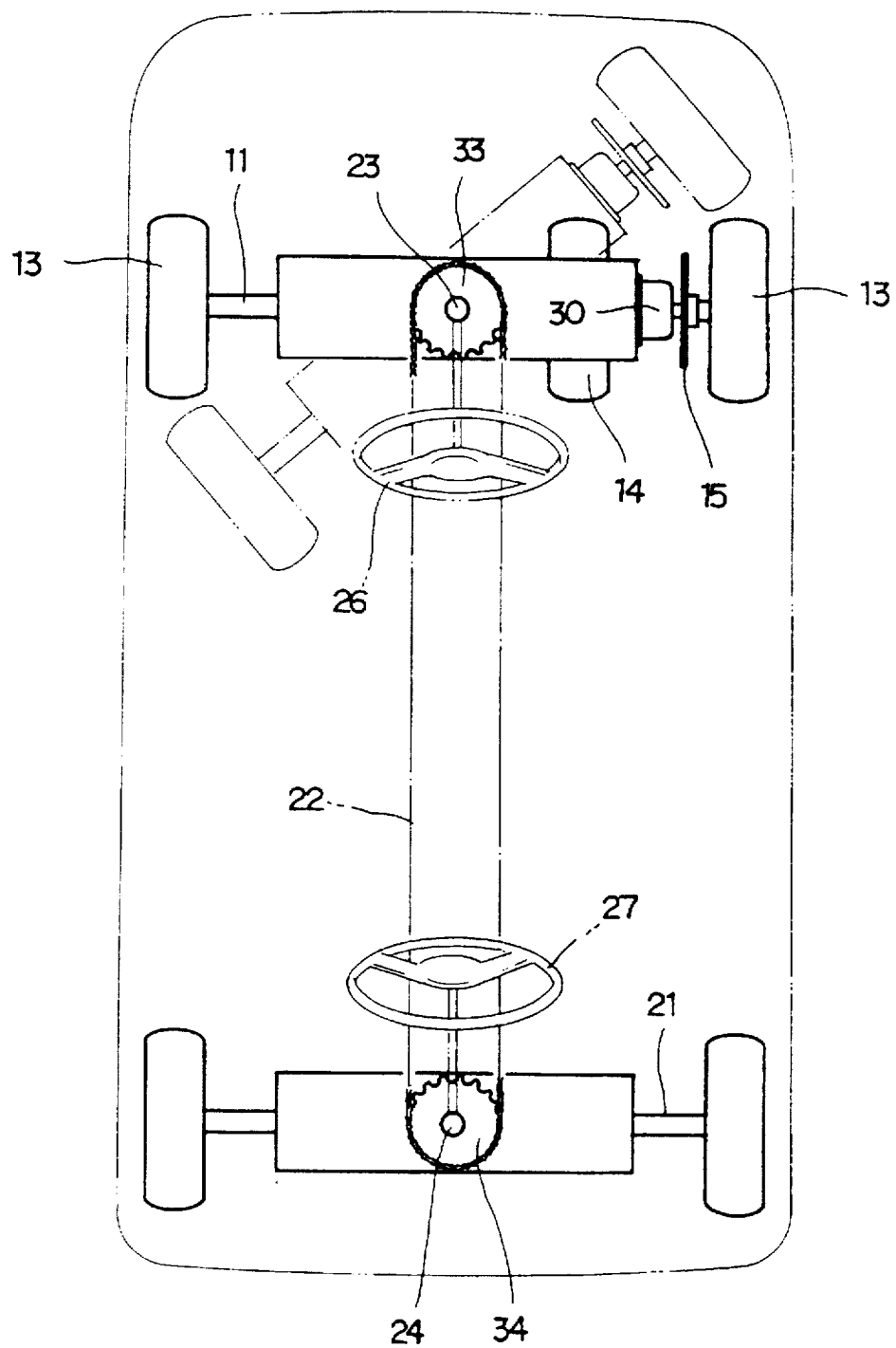
FIG. 5 is a schematic plan view illustrating an amusement car equipped with a steering device in accordance with a second embodiment of the present invention.

FIG. 5 is a plan view schematically illustrating a amusing car which includes two steering handles in accordance with a second embodiment of the present invention. One of the steering handles is for a driver whereas the other steering handle is for a supervising adult. In FIG. 5, elements respectively corresponding to those in FIGS. 1 to 3 are denoted by the same reference numerals.

In accordance with this embodiment of the present invention, the amusement car includes a pair of rotating shafts 23 and 24 operatively coupled to front and rear wheel shafts 11 and 21, respectively. To the rotating shafts 23 and 24, a pair of sprockets 33 and 34 are mounted. The sprockets 33 and 34 are coupled to each other by a chain 22. A pair of steering handles 26 and 27 are coupled to respective upper ends of the rotating shafts 23 and 24. The front steering handle 26 is adapted to be manipulated by a driver whereas the rear steering handle 27 is adapted to be manipulated by a supervising adult.

In particular, the rear steering handle 27 is operatively connected to the front steering handle 26 so that it can be used as an assistant steering handle. When the child driver cannot cope with an obstacle or other dangerous situation appearing in front of him, the supervising adult can steer the car by manipulating the assistant steering handle 27. In a relaxed state of mind the child can still grip his steering handle 26, accordingly, he can experience how the dangerous situation is overcome.

In this case wherein the amusement car includes two steering handles 26 and 27, the driver can feel the advantages and interest of car driving, as if he were actually drives a real car, by manipulating the appropriately selected one of the steering handles 26 and 27. When a teenage driver who is a well-developed athlete desires to change the advance direction of the amusement car by 90° or 180° (U-turn) or to run the amusing car backwardly while playing using the front steering handle 26, he manipulates the rear steering handle 27 in place of the front steering handle 26. In this case, the front wheel shaft 11 is appropriately steered by the manipulation of the rear steering handle 27, so that the driver can drive the car continuously.

As apparent from the above description, the two steering handles 26 and 27 have different functions, respectively. Where the amusement car is driven while being steered in a front steering fashion by manipulating the front steering handle 26, it runs along a normal path. On the other hand, when the amusement car is steered in a rear steering fashion by manipulating the rear steering handle 27, the drive wheel 14 mounted on the front wheel shaft 11 is turned by the rotation of the rear steering handle 27, as shown in FIG. 5. In the latter case, the steering can be carried out at various steering angles such as 90°, 180°, 270°, 360° etc. in accordance with the rotational angle of the rear steering handle 27 and the rotational angle keeping time. When the wheel shaft 11 is turned through an angle of 180°, the amusement car runs backwards. As the steering manipulation is repeated in normal and reverse directions while appropriately varying the steering angle, a variety of driving feelings can be obtained as in driving a car that requires gear shifting. In other words, the amusement car can make the driver escape from the simple uninteresting play provided by driving the car in a single direction, thereby enhancing the pleasure of driving.

Where a child driver drives the amusement car in accordance with the present invention in a manner similar to those in conventional amusement cars, he drives the amusement car while steering it by manipulating the front steering handle 26. The amusement car can be driven by a drive power from the motor 61 generated by electric power from the battery 41. The electric power from the battery 41 is transmitted to the motor 61 via the power line extending from the battery 41 and the contact members 42 connected to lead ends of the power line.

In particular, the contact members 42 are in contact with the annular contact plates 31 mounted on the bracket 17 to supply the electric power from the battery 41 to the motor 61. With this construction, the electric power from the battery 41 can always be transmitted to the motor 61 irrespective of any interfering situation appearing in front of the amusement car. In other words, each contact member 42 and each corresponding annular contact plate 31 can maintain a stable contact condition even when the steering handle 26 is more or less excessively rotated. This is because the annular contact plates 31 have concentric, annular contact surfaces which ensure contact of the contact members 42 irrespective of the rotation angle of the steering handle 26, respectively.

When the amusement car crashes against another car or some other obstacle while driving at a constant speed, the drive wheel 14, which is disposed at a position spaced apart from the central portion of the wheel shaft 11, is turned about the central portion of the wheel shaft 11, thereby turning the wheel shaft 11. By this action of the wheel shaft 11, the amusement car is automatically and rapidly steered to escape from the obstacle.

At this time, the idle wheels 13, which are respectively mounted to both ends of the wheel shaft 11, serve to keep the balance of the car body because they are supported by the bearings 12 such that they rotate freely. These idle wheels 13 also support the drive wheel 14 exhibiting a relatively large wearing, at both ends of the wheel shaft 11, thereby sharing the wearing of the driving wheel 11 with each other. In other words, the idle wheels 13 have a function of improving the durability or use life of the drive wheel 14.

When the steering handle 26 is manipulated, stable steering can always be ensured irrespective of the rotational angle of the steering handle 26 because the rotating shaft 23 coupled to the steering handle 26 is rotatably supported by the bearing 45 mounted to the car body 40 and because no flexible wire is used in accordance with the present invention.

For children who are unskilled in driving amusement cars, the amusement car equipped with the steering device according with the second embodiment of the present invention can be used which includes a pair of operatively connected steering handles respectively being for a driver and a supervising adult. Since the steering handles 26 and 27 are coupled to the rotating shafts 23 and 24 respectively coupled to the front and rear wheel shafts 11 and 21 and connected to each other by the chain 22, the supervising adult can safely steer the amusement car without interfering with the child's play by manipulating the assistant steering handle 27.

As apparent from the above description, the present invention provides a steering device for a amusement car including a pair of idle wheels freely rotatably mounted to both ends of a wheel shaft by means of bearings, and a drive wheel fixedly mounted to the wheel shaft at a position spaced toward one side apart from the central portion of the wheel shaft. To the wheel shaft, a bracket is also mounted in which a motor is installed. In one side of the drive wheel, a sprocket is mounted to the wheel shaft and chain-connected to another sprocket which is mounted to the shaft of the motor. On the top surface of the bracket, a pair of annular contact plates respectively having different diameters are disposed which are connected to electric terminals of the motor, respectively. The annular contact plates are in contact with a pair of contact members connected to different leads of a power line extending from a battery carried in the car body, respectively. With such a construction, the steering device of the present invention can have an unlimited steering range so that it can rapidly cope with any situation. Accordingly, the steering device can provide various advantages of turning similar to those obtained upon actually driving a car is driven, in accordance with the rotational degree of the steering handle. When the amusement car crashes against another car or some other obstacle while driving at a constant speed, the drive wheel is turned about the central portion of the wheel shaft, thereby turning the wheel shaft. By this action of the wheel shaft, the amusement car is automatically and rapidly steered to escape from the obstacle. The steering handle may also include an assistant steering handle for a supervising adult which is operatively connected with a driver's steering handle. In this case, even child drivers who are unskilled in driving amusement cars can drive the amusement car in a relaxed state of mind.

Although the preferred embodiments of the invention have been disclosed for illustrative purposes, those skilled in the art will appreciate that various modifications, additions and substitutions are possible, without departing from the scope and spirit of the invention as disclosed in the accompanying claims. For example, only one steering handle may be coupled to a selected one of the rotating shafts respectively coupled to the front and rear wheel shafts.

What is claimed is:

1. A steering device for an amusement car comprising:
 a bracket supporting on a first side a drive motor and motor shaft;
 a wheel shaft mounted to said bracket by mounting members and operatively coupled to said motor shaft so that rotational motion of said motor shaft is transmitted to said wheel shaft;
 a freely rotating idle wheel mounted at each end of said wheel shaft;
 a drive wheel fixedly mounted off-center to said wheel shaft;
 a pair of annular contact plates of differing diameters mounted to a second side of said bracket and connected to electric terminals of said motor for engaging a pair of contact members connected to electric terminals of a power source; and a steering shaft fixedly mounted to said second side of said bracket so that rotation of said steer shaft results in rotation of said bracket and resulting movement of said wheel shaft to steer said amusement car.

2. The steering device of claim 1 wherein said drive wheel is mounted in an area of said wheel shaft bounded by a first point on said wheel shaft spaced from the center of said wheel shaft a distance corresponding to the radius of said drive wheel, and a second point on said wheel shaft spaced from the center of said wheel shaft a distance corresponding to the diameter of said drive wheel.

3. The steering device of claim 1, further comprising:

a second bracket supporting a second wheel shaft;

a second steering shaft fixedly mounted to said second bracket and coupled to said second wheel shaft, said second steering shaft operatively coupled to said steering shaft to transmit motion of said second steering shaft to said steering shaft to allow steering of the car from said second steering shaft.

4. The steering device of claim 1, further comprising a steering wheel attached to said steering shaft.

5. The steering device of claim 3, further comprising a steering wheel attached to said second steering shaft.

* * * * *